United States Patent
Winslow (10) Patent No.: US 6,314,348 B1
(45) Date of Patent: *Nov. 6, 2001

(54) CORRECTION CONTROL FOR GUIDANCE CONTROL SYSTEM

(75) Inventor: Phillip D. Winslow, Hayward, CA (US)

(73) Assignee: Trimble Navigation Limited, Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/021,739

(22) Filed: Feb. 11, 1998

(51) Int. Cl.[7] ....................................... G06F 19/00
(52) U.S. Cl. ................. 701/23; 701/26; 701/41; 180/168
(58) Field of Search .................. 701/41, 42, 23, 701/25, 26, 28, 50, 202, 205, 210; 180/168, 169, 443, 446, 408, 412; 348/118, 119, 120

(56) References Cited

U.S. PATENT DOCUMENTS

| | | | |
|---|---|---|---|
| 4,860,209 | * 8/1989 | Sugimoto | 180/169 |
| 5,103,924 | * 4/1992 | Walker | 180/131 |
| 5,234,070 | * 8/1993 | Noah et al. | 180/169 |
| 5,373,911 | * 12/1994 | Yasui | 180/168 |
| 5,485,378 | * 1/1996 | Franke et al. | 701/41 |
| 5,517,412 | * 5/1996 | Unoura | 701/23 |
| 5,684,476 | 11/1997 | Anderson | 340/988 |
| 5,765,116 | * 6/1998 | Wison-Jones et al. | 701/41 |
| 5,774,069 | 6/1998 | Tanaka et al. | 340/903 |
| 5,781,870 | * 7/1998 | Okawa | 701/25 |
| 5,875,408 | * 2/1999 | Bendett et al. | 701/23 |
| 5,913,375 | * 6/1999 | Nishkawa | 180/168 |
| 5,925,080 | * 7/1999 | Shimbara et al. | 701/23 |

* cited by examiner

Primary Examiner—Tan Nguyen
(74) Attorney, Agent, or Firm—Wagner Murabito & Hao LLP (57) ABSTRACT

A method and apparatus which allows for corrections to be made to the path of a vehicle when an automatic steering control feature of a guidance control system is in operation. A sensor is coupled to the steering system detects movement of the steering wheel by the operator. When the operator moves the steering wheel the logic of the correction controller adjusts the travel path of the vehicle to correspond to the movement of the steering wheel. In one embodiment the travel path is adjusted by instructions transmitted to the controller of the guidance control system. Correction of the travel path may also be obtained by the operation of a keypad or a joystick.

20 Claims, 6 Drawing Sheets

CORRECTION CONTROL FOR GUIDANCE CONTROL SYSTEM

TECHNICAL FIELD

This invention relates to vehicle automated guidance control systems. Specifically, the present invention relates to a method and apparatus for correcting the path of a vehicle when the vehicle is under the control of a guidance control system.

BACKGROUND ART

Tractors and other vehicles used in farming operations must be operated precisely to obtain uniform rows during planting and to harvest crops efficiently. Typically tractors used for planting rows of crops are operated manually by an operator who drives the tractor along each row to be planted. The operator must be very careful in order to get uniform rows of planted crops. It is difficult for an operator of a tractor to maintain precise positioning of the tractor relative to rows which have already been planted since the operator has no reference other than the position of the row which was most recently been planted to use as a guide. In addition, it is difficult to maintain the concentration necessary to obtain straight rows, particularly since concentration often decreases with each passing hour and minute of planting.

One prior art method for controlling the travel path of a vehicle such as a tractor includes the use of a guidance control system that includes an automatic steering control feature. Guidance control systems for tractors typically incorporate a method for position determination such as use of a global positioning system. However, other position determination systems may also be used. These guidance control systems typically include a position determining system for determining position and a vehicle controller for controlling the steering of the vehicle. One method for position determination involves the use of satellites of the US Global Positioning System (GPS) to determine position. The guidance system typically also includes a vehicle controller operable in response to an operator input mechanism. In one such system, the operator positions the tractor at the beginning of a row in response to feedback on a display.

The display may indicate the position of the vehicle or indicate the direction that the operator must move in order to properly determine the appropriate starting point for a row. Once the operator is properly positioned and is ready to start planting a row, the operator engages an input device so as to activate the automatic steering control feature of the guidance control system. The automatic steering control feature of the guidance control system controls the steering of the tractor so as to maintain proper alignment of the vehicle as a row is planted.

When an automated steering control feature of a guidance control system is used, an operator is typically required to first enter into the guidance control system a set of parameters that describe the relationship between the tool and the tractor. This may include, xyz offset, row spacing of the crop and number of rows (or tool width). This allows an operator to attach different tools to a particular tractor. In practice, the set of parameters for a particular tool could be stored in a pre-defined library within the guidance control system and allows the operator to select a tool from a pre-defined, list of pre-configured tools instead of entering a complicated set of numerical parameters.

The guidance control system may be used several times during the growing season over the same rows. It may be used first to plow the ground, again to plant seeds, another time for weed removal between plant rows and finally for harvest. Ideally, each pass is aligned with the next pass with a minimum of error. However, errors do occur. Some of these errors arise because: 1) each tractor/tool combination has its own set of errors; 2) poor traction may result in reduced line accuracy; and 3) differences in equipment manufacturers may result in misalignment between tools. On a given pass, the guidance control system may provide excellent alignment with an ideal crop row as defined by a theoretical set of GPS coordinates. However, this is of little value if the row was originally installed with large errors and the result is plant destruction by the tractor tires or deficient fertilizer because the nozzle was positioned over dirt instead of over the plant row.

When an operator discovers that the tractor is not following the required path, the operator typically does not have time to enter a new offset and/or to otherwise correct the problem. Thus, when an operator discovers that the tractor is not following the required path, he has only two choices: 1) he can run on the exact pre-planned path as described in the mission and run the risk of destroying crops; or 2) he can override the guidance control system and operate the vehicle in manual steering mode.

When the operator overrides the guidance control system, all of the benefits of the guidance control system are lost. Visibility problems, basic consistency and the ability to follow complicated curved paths are suddenly reduced to the operators ability to manually steer the vehicle. Furthermore, to switch the guidance control system back to automatic, the operator must compare the current vehicle location (as determined by his driving) with the intended path and mentally asses whether the error condition that forced manual mode has gone away. This requires the operator to look at a display of some sort to determine if the actual row location is on the pre-planned track. Since the operator is busy steering the vehicle, this comparison requires substantial ability by the operator to perform multiple tasks. Additionally, the whole process is problematic because manual steering errors appear as tracking errors on the display. This makes use of the guidance control system difficult, particularly when only a small correction is required.

What is needed is a way to easily correct for errors in travel path when operating a vehicle under automatic steering control. More particularly, a way to correct travel path which will not require the operator to disengaged the automated guidance feature is needed. The present invention meets the above needs.

DISCLOSURE OF THE INVENTION

The present invention provides a method and apparatus which allows for on-the-fly correction to travel path of a vehicle when the automatic steering control feature of a guidance control system is engaged.

A navigation correction system is disclosed which is electrically connected to the vehicle's guidance control system. In one embodiment the navigation correction system corrects the travel path of the vehicle in response to the movement of the steering wheel by the operator of the vehicle when the automatic steering control feature of the guidance control system is engaged. One or more sensors coupled to the vehicle steering system are monitored so as to determine whether the operator has moved the steering wheel. In one embodiment, the amount of correction applied is proportional to the amount of movement of the steering wheel.

The navigation correction system of the present invention is operable in conjunction with all types of automatic steering control systems. In particular, the navigation correction system of the present invention is operable in conjunction with steering control systems which use GPS, differential GPS, real time kinematics (RTK), and other methods for determining position.

In one embodiment of the present invention the correction to the travel path is made by altering the amount of offset that is programmed into the guidance control system. Alternatively, a new travel path is computed and the correction is made by transmitting the new travel path to the controller of the guidance control system.

Thus, when the vehicle begins to move in the wrong direction the operator simply turns the steering wheel in the direction in which he desires the correction. The navigation correction system of the present invention then makes a correction to the travel path. Additional corrections are easily made by further movement of the steering wheel.

When the navigation correction system of the present invention is installed on a vehicle which has a guidance control system, the navigation correction system of the present invention allows an operator to make corrections in a similar intuitive fashion to driving any vehicle.

The navigation correction system of the present invention also saves time and minimizes operator frustration since the operator does not have disengage the automated guidance feature and drive the vehicle manually. In addition, the operator does not have to try to determine whether or not the automated guidance feature may be re-engaged.

Though the present invention is described with reference to use in a vehicle which is a tractor, the present invention may be used in other types of vehicles such as, for example, harvesters, wind rowers, spray rigs, fertilizer delivery vehicles, pesticide delivery vehicles, track vehicles, belt driven tractors, and harvest collection vehicles such as general purpose trucks, flat bed trucks, and tractor-trailer rigs.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "designating", "incorporating", "calculating", "determining", "communicating" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

Figure 1:
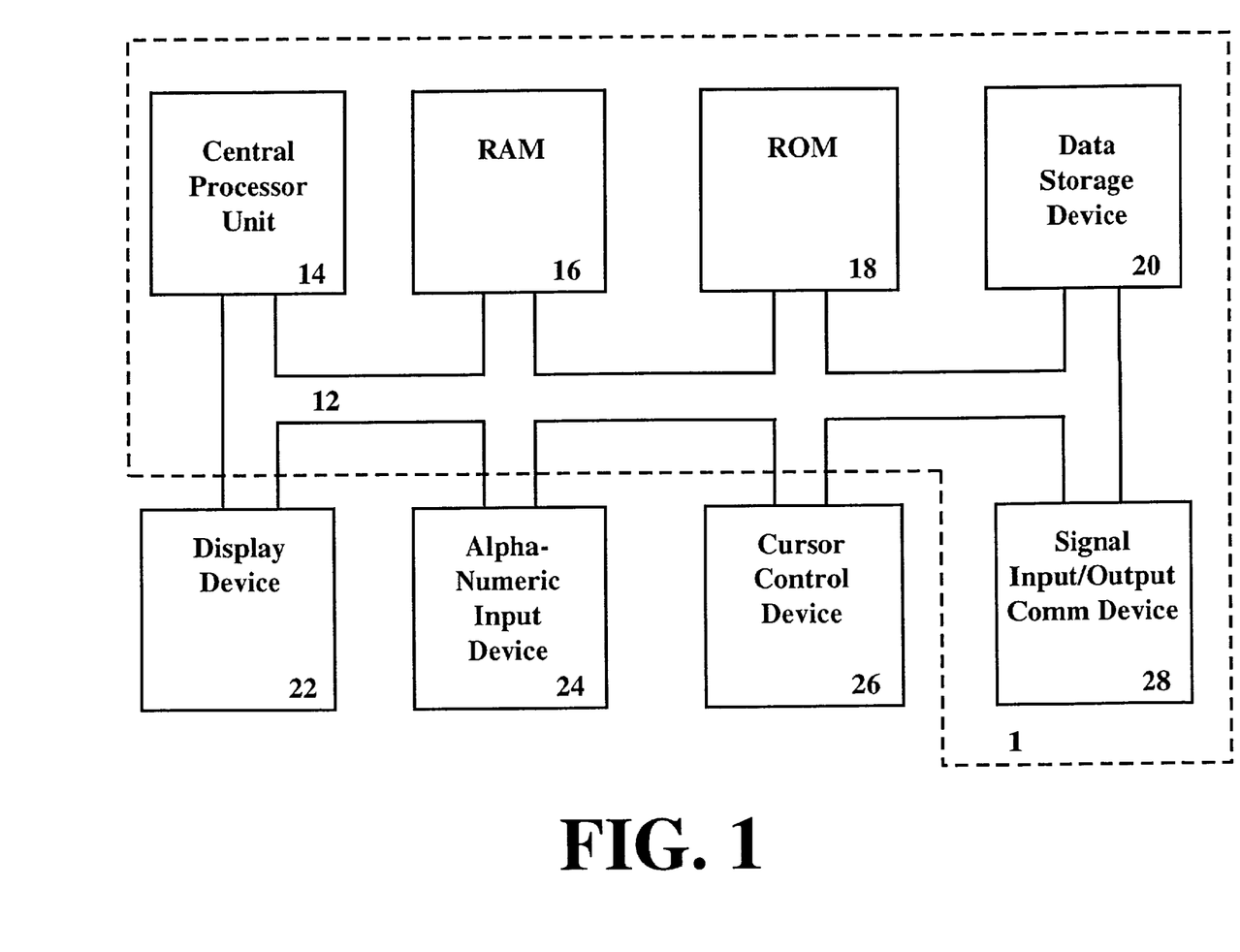
FIG. 1 is a schematic diagram of an exemplary computer system used as a part of a navigation correction system in accordance with the present invention.

With reference now to FIG. 1, portions of the navigation correction system of the present invention are comprised of computer executable instructions which reside in a computer system. FIG. 1 illustrates an exemplary computer system 1 used as a part of a navigation correction system in accordance with the present invention. It is appreciated that the computer system 1 of FIG. 1 is exemplary only and that the present invention can operate within a number of different computer systems including general purpose computers systems, embedded computer systems, and stand alone computer systems.

Computer system 1 of FIG. 1 includes an address/data bus 12 for communicating information, a central processor unit 14 coupled to bus 12 for processing information and instructions. Computer system 1 also includes data storage features such as a random access memory 16 coupled to bus 12 for storing information and instructions for central processor unit 14, a read only memory 18 coupled to bus 12 for storing static information and instructions for the central processor unit 14, and a data storage device 20 (e.g., a magnetic or optical disk and disk drive) coupled to bus 12 for storing information and instructions. Computer system 1 of the present embodiment also includes a display device 22 coupled to bus 12 for displaying information to a computer operator. An alphanumeric input device 24 including alphanumeric and function keys is coupled to bus 12 for communicating information and command selections to central processor unit 14.

Display device 22 of FIG. 1, utilized with computer system 1 of the present invention, may be a liquid crystal device, cathode ray tube, or other display device suitable for creating graphic images and alphanumeric characters recognizable to the user. Cursor control device 26 allows the computer user to dynamically signal the two dimensional movement of a visible symbol (cursor) on a display screen of display device 22. Many implementations of cursor control device 26 are known in the art including a trackball, mouse, touch pad, joystick or special keys on alphanumeric input device 24 capable of signaling movement of a given direction or manner of displacement. Alternatively, it will be appreciated that a cursor can be directed and/or activated via input from alphanumeric input device 24 using special keys and key sequence commands. The present invention is also well suited to directing a cursor by other means such as, for example, voice commands. Computer system 1 also includes a cursor control device 26 coupled to bus 12 for communicating user input information and command selections to central processor unit 14, and a signal input output communication device 28 (e.g. a modem) coupled to bus 12.

Figure 2:
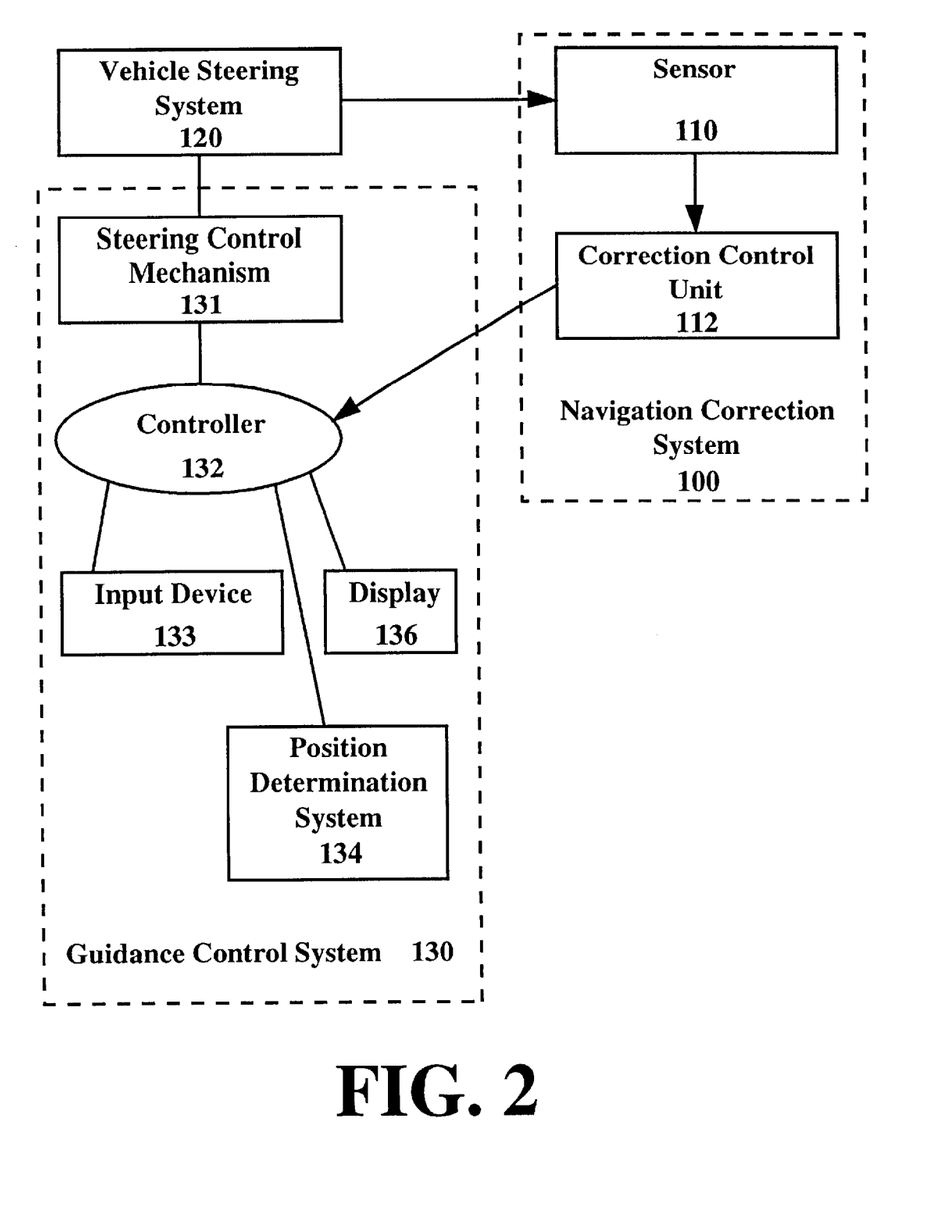
FIG. 2 is a logical representation of a navigation correction system that includes a sensor and a correction control unit in accordance with the present claimed invention.

FIG. 2 shows a navigation correction system for correcting vehicle travel path when guidance control system 130 is controlling vehicle steering system 120. Typically, a vehicle's steering system, shown generally as vehicle steering system 120, includes a steering wheel and a hydraulic system for translating the movement of the steering wheel to the wheels of the vehicle. Guidance control system 130 is shown to include steering control mechanism 131 which controls vehicle steering system 120. Steering control mechanism 131 may use any of a number of known methods for controlling vehicle steering system 120. In one embodiment, steering controller is an electro-hydraulic system that interacts with the hydraulic system of vehicle steering system 120 so as to control the steering of a vehicle. Guidance control system 130 also includes controller 132 which, in response to input through input device 133 and position determination system 134 determines steering instructions which are communicated to steering control mechanism 131. Typically, controller 132 includes electronic circuitry which couples instructions to steering control mechanism 131. Display 136 allows a user to monitor the operation of guidance control system 130.

Sensor 110 is coupled to vehicle steering system 120. Sensor 110 is electrically connected to correction control unit 112 such that movement of vehicle steering system 120 is communicated to correction control unit 112. Correction control unit 112 is coupled to controller 132 of guidance control system 130 of FIG. 2.

Figure 3:
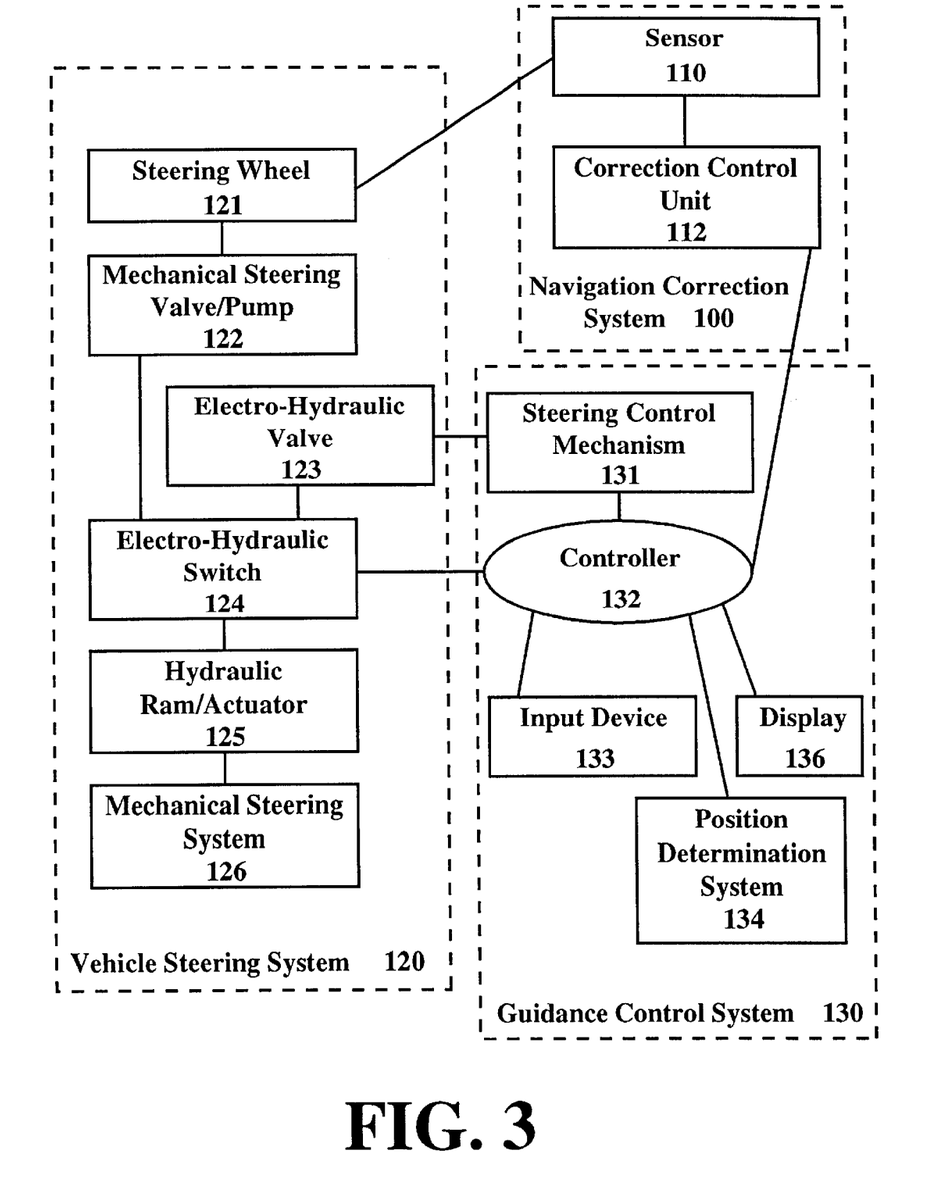
FIG. 3 is a logical representation of a navigation correction system coupled to a guidance control system and a typical vehicle steering system in accordance with the present claimed invention.

FIG. 3 shows a typical vehicle steering system which is coupled to a guidance control system and a navigation correction system. Vehicle steering system 120 is shown to include steering wheel 121 which is coupled to mechanical steering valve/pump 122. Mechanical steering valve/pump 122 is coupled to electro hydraulic switch 124 which is in turn coupled to electro-hydraulic valve 123 and hydraulic ram/actuator 125. Hydraulic ram/actuator 125 is coupled to mechanical steering system 126.

Continuing with FIG. 3, navigation correction system 100 monitors the movement of steering wheel 121. That is, sensor 110 monitors the movement of steering wheel 121. Guidance control system 130 is coupled to vehicle steering system 120. More particularly, steering control mechanism 131 is coupled to electro hydraulic valve 123 and controller 132 is coupled to electro hydraulic switch 124.

Correction control unit 112 of FIGS. 2–3 includes electronic circuits for analyzing movement of vehicle steering system 120 and for determining the necessary correction, and for generating instructions to obtain the desire correction. In particular, in one embodiment, correction control unit 112 of FIGS. 2–3 includes a computer system such as computer system 1 of FIG. 1. When the movement of the steering system indicates that a correction is to be made, correction control unit 112 of FIGS. 2–3 interacts with the guidance control system so as to obtain the desired correction. When a computer such as computer 1 is used in a navigation correction system, the direction of travel is corrected by sending an instruction from computer 1 to the appropriate location in the connected guidance control system.

Figure 4:
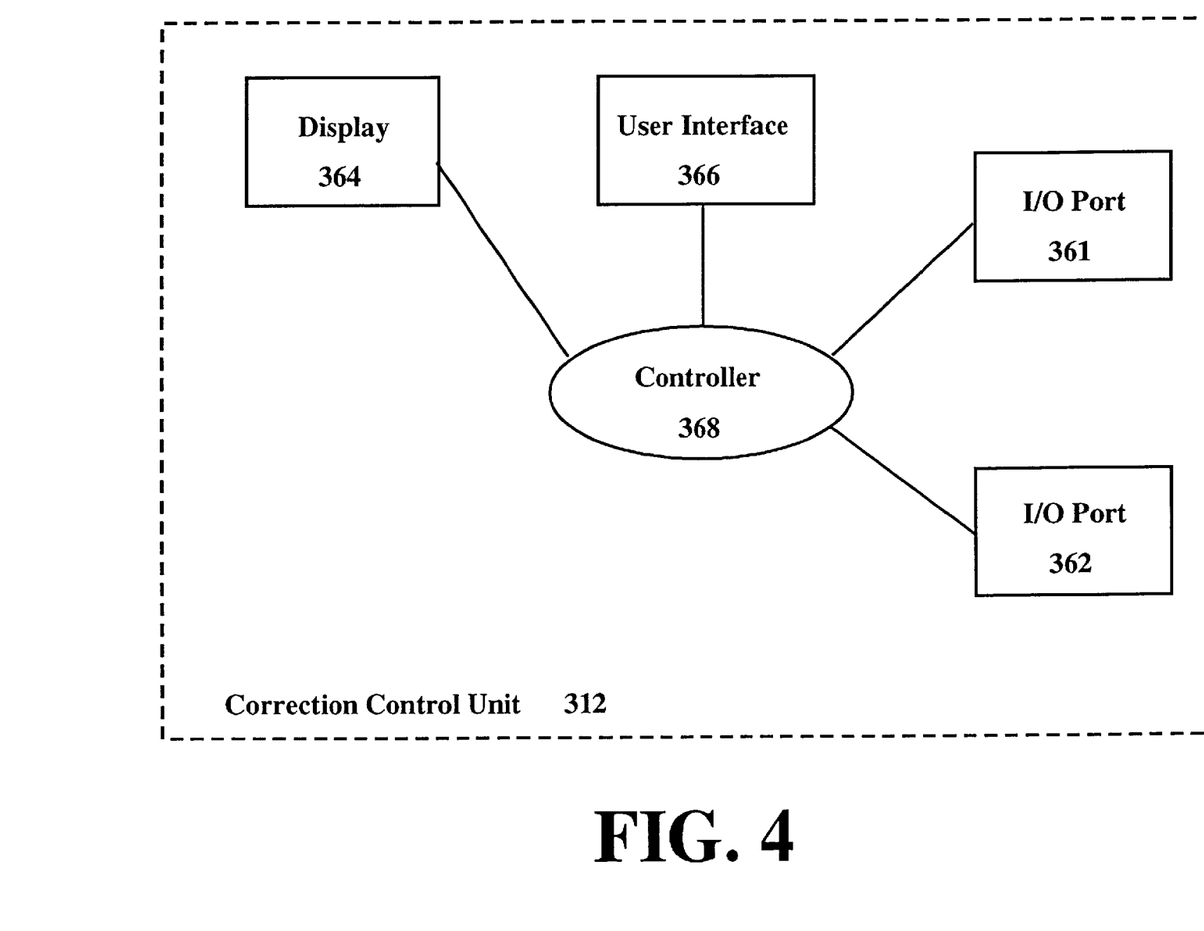
FIG. 4 is a logical representation of a correction control unit in accordance with the present claimed invention.

In the embodiment shown in FIG. 4, correction control unit 312 does not include all of the components of computer 1 of FIG. 1. Correction control unit 312 of FIG. 4 includes controller 368 which is operable in response to input from user interface 366 and which is connected with other devices and components through input and output ports such as I/O ports 361–362. Correction control unit 312 also includes display 364 for visual display. In one embodiment, controller 368 is a integrated circuit device such as a microcontroller or an application specific integrated circuit device (ASIC) or a field programmable gate array (FPGA) device.

In an embodiment where one or more sensors are coupled to correction control unit 312 which are analog, correction control unit 312 will include an analog to digital converter (not shown) for converting the analog signals received from the sensor or sensors into digital form and coupling the digital signals to controller 368.

In one embodiment sensor 110 shown in FIGS. 2–3 is a position encoder sensor and/or an angular rate encoder, and/or a torque encoder, or a combination thereof. Alternatively, limit detectors or electro-hydraulic valves coupled to the hydraulic system could be used to determine movement based on volume of fluid flow, and/or fluid flow rate. Also, pressure sensors may be used which detect the pressure of the hydraulic fluid in the manual steering pump. In addition, sensor 110 may include multiple sensors which operate to sense the movement of vehicle steering system 120.

Figure 5:
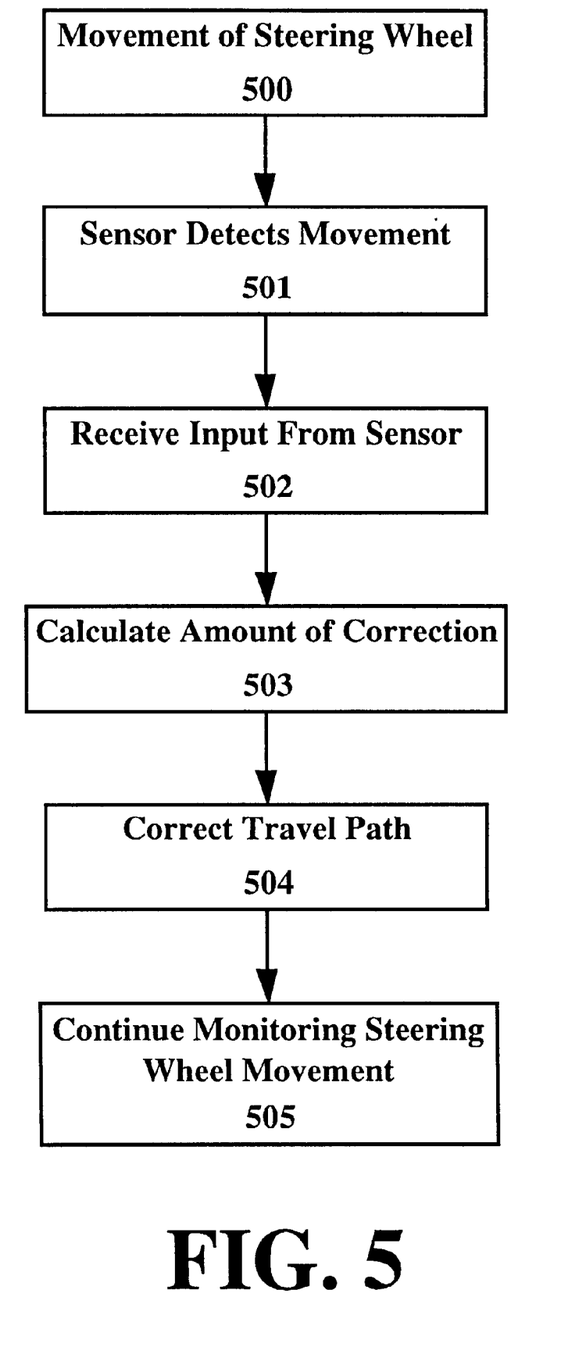
FIG. 5 is a schematic diagram illustrating the steps for correcting the travel path directed by a guidance control system in accordance with one embodiment of the present claimed invention.

FIG. 5 shows the steps for correcting the path of a vehicle using the navigation correction system of the present invention. When the operator moves the steering wheel as shown in step 500, the movement of the steering wheel is detected by a sensor as shown by step 501. In one embodiment, the sensor determines the amount of movement and the direction of movement of the steering wheel. Electrical signals from the sensor indicating the amount of movement and the direction of movement are received as input by the correction control unit as shown by step 502. In the embodiment shown in FIGS. 2–3, input is received by correction control unit 112. The input is preferably in digital form; however the signal may also be in analog form. When the input is in analog form an analog to digital converter is used to convert the signal to a digital signal.

Continuing with FIG. 5, the amount of correction is calculated as shown in step 503. In one embodiment the amount of correction is proportional to the amount of movement of the steering wheel. In one embodiment the amount of correction is defined by a predetermined correction ratio. The correction ratio is preset at one inch for every five degrees of movement. However, the correction ratio is user definable. such that the user may set the correction ratio to be more or less than the preset amount. Thus, when the correction ratio is set at one inch for every five degrees of steering wheel movement, movement of the steering wheel to the right 5 degrees gives a calculated amount of correction of one inch of correction to the right.

The travel path is corrected to one side or the other as determined by the direction in which the operator turns the steering wheel. Thus, for example, if the operator turns the steering wheel to the left, a correction is made so as to move the vehicle's travel path to the left. Similarly, for example, when the operator turns the steering wheel to the right, a correction is made so as to move the vehicle's travel path to the right.

Next, as shown by step 504 of FIG. 5, the travel path of the vehicle is corrected. In the embodiment shown in FIGS. 2–3, the correction is made by electronically communicating with controller 132 so as to direct the controller to change the offset by the desired amount. In guidance control systems in which correction of the offset is not effective to cause the vehicle to move the desired amount, a new travel path is computed by correction control unit 112 which is communicated to the guidance control system 130.

After the travel path of the vehicle is corrected as indicated by the operator, the movement of the steering wheel continues to be monitored for additional corrections. Thus the user is free to make multiple corrections on-the-fly when the automated steering control feature is engaged.

For example, if the operator is using a spraying rig which is spraying insecticide on a row of plants, and the operator encounters a steeply sloping grade such that the spray nozzles are not properly aligned with the row of plants, he may move the steering vehicle to the right one inch by moving the steering wheel to the right five degrees. When the vehicle passes the steeply sloping grade the operator can move back to the original alignment by moving the steering wheel five degrees to the left. Alternatively a reset button may be provided so as to allow the operator to easily move back to the condition of no correction. This would allow the operator to move back into the original alignment by hitting the reset button.

Figure 6:
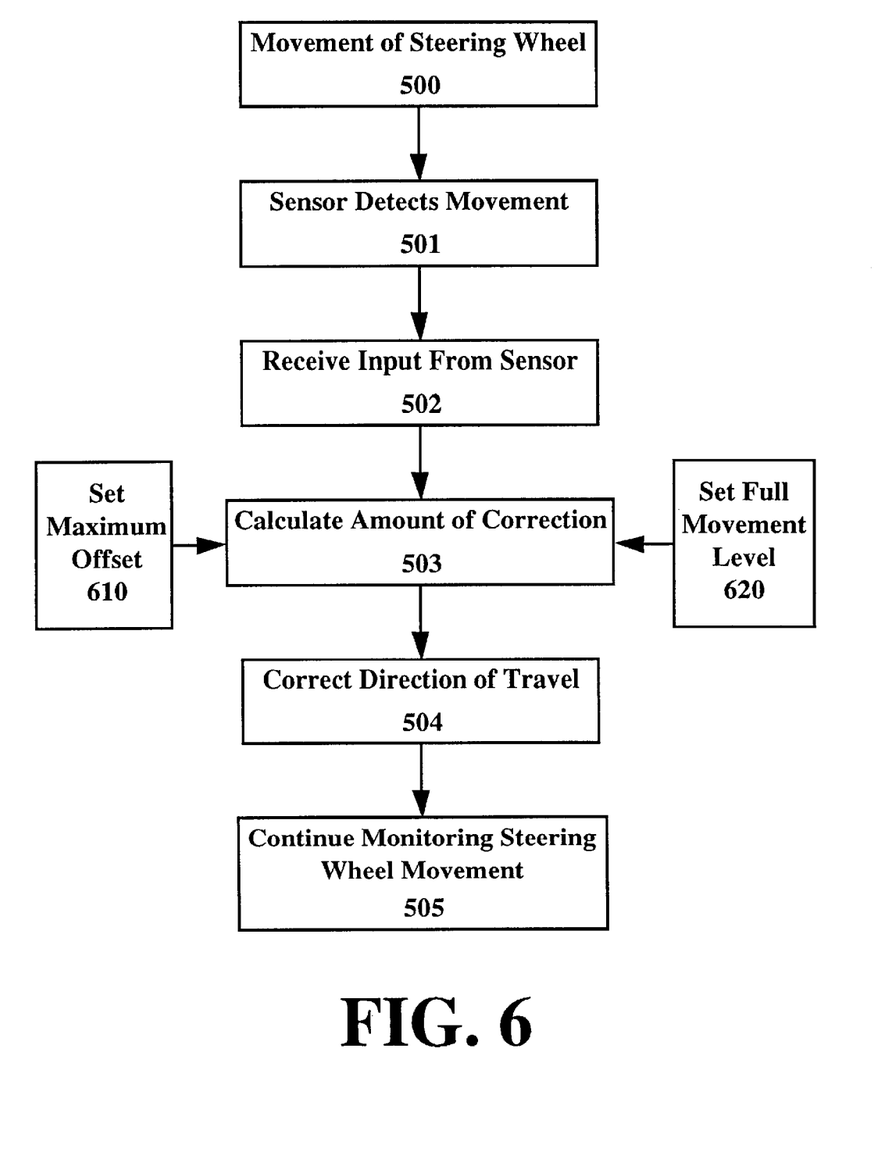
FIG. 6 is a schematic diagram illustrating the steps for correcting the travel path directed by a guidance control system in accordance with a second embodiment the present claimed invention.

In an alternate embodiment which is shown in FIG. 6, only a predetermined amount of correction is allowed for any one movement of the steering wheel (hereinafter "maximum offset"). This allows an operator to more precisely control the amount of correction. The maximum offset may be set by the user as shown by step 610. However, initially the maximum offset is preset at 20 inches. This corresponds to a typical distance from one row of crops to the next row of crops since the typical spacing between rows is 20 to 22 inches. This gives 20 inches of movement when the steering wheel is turned through the full movement level.

The full movement level is the amount of movement which is required of the steering wheel in order to obtain the maximum offset amount of correction. The fill movement level is user defined and may be set by the operator as shown by step 620 of FIG. 6. The value of the full movement level is preset at 90 degrees. Thus, the user may change the full movement level to suit his particular needs. The use of a full movement level and a maximum offset allows the operator to precisely control the correction in the travel path of the vehicle for a given amount of movement of the steering wheel.

Continuing with FIG. 6, the user may correct travel path as much as he desires; however, the amount of travel path correction obtained by any one event of movement of the steering wheel is limited to a predetermined amount. This predetermined amount is the maximum offset. This allows the movement of the steering wheel more than or equal to 90 degrees to effect the full 20 inches of correction (the preset maximum offset). Movement less than 90 degrees provides a proportional amount of movement. For example, when the steering wheel is moved 45 degrees to the right (one half of the 90 degree range), a correction of ten inches is calculated (represented by the formula [radial distance moved/predetermined full movement level] * maximum offset= amount of movement) which in this case yields 10 inches of correction ([45/90]*20).

In one embodiment of the present invention the full movement level is stored as a full movement level value and the maximum offset is stored as a maximum offset value in a data storage device such as data storage device 20 of FIG. 1. Alternatively, the full movement level and the maximum offset are stored as executable instructions in correction control unit 112. Alternatively, the amount of correction is determined using one or more linear or nonlinear functions. In one embodiment a nonlinear function is used which determines the amount of correction based on sensitivity and full movement levels determined by comparing sensor input to values contained in a look-up chart.

One problem that may occur when sensing steering wheel movement is movement of the steering wheel which is not caused by the operator. Movement which is not due to the movement of the steering wheel by the operator should not generate a correction. This type of movement is typically caused by the vibration of the vehicle. In one embodiment a correction button is used such that only a deliberate movement of the steering wheel will generate a correction. This prevents the vibration of the vehicle from causing an unbalanced steering wheel to rotate so as to generate an undesired correction.

In one embodiment corrections are only made when the steering wheel is moved as the button is depressed. Alternatively, the position of the steering wheel is sensed at the time the button is pressed. In such an embodiment, the user would move the steering wheel so as to indicate the desired correction and would then operate the button. The requirement that the operator hit the button prevents an undesired correction from occurring upon accidental movement of the steering wheel by the operator would not cause an undesired correction. Alternatively, a switch or other user input device could be used to indicate that the operator desires to correct the travel path of the vehicle.

The navigation correction system of the present invention is also well suited for use with other methods for obtaining operator input. In one embodiment, an input device such as a joystick, a toggle switch or a keypad that includes special function keys is used to obtain operator input. In one embodiment, a joystick is located where the operator may easily reach it. The operation of the input device by the operator of the vehicle will then generate a correction to the direction of travel of the vehicle. The direction in which the operator moves the toggle switch determines the direction in which the correction is to be made and the amount of movement to the left or right determines the amount of the correction. In addition, one or more switch on the joystick could be pressed to indicate that a correction is required.

The navigation correction system of the present invention is well suited for implementation directly into a guidance control system, either as a software program or a set of executable instructions to be performed by the guidance control system. In one embodiment, the navigation correction system of the present invention is stored in the guidance control system as a software program which receives input from sensors which are a part of the guidance control system. In an alternate embodiment, the navigation correction system of the present invention is stored in a computer useable medium such as a floppy disk or a computer disk (CD) or a removable tape storage device as a software program. In one embodiment, the navigation correction system of the present invention could be implemented into a general purpose computer such as computer 1 of FIG. 1.

Though the navigation correction system of the present invention is shown to correct travel path by generating instructions which are transmitted as electrical signals which are interpreted by the guidance control system; depending on the configuration of the guidance control system, other methods of obtaining the desired correction to travel path may also be used.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A navigation correction system comprising:
   a sensor for detecting operator input; and
   a correction control unit coupled to said sensor for monitoring said sensor, said correction control unit operable, upon operator input indicating a correction to a travel path of a vehicle, to communicate with a guidance control system so as to correct said travel path of said vehicle without returning control of steering of said vehicle to an operator of said vehicle.

2. The navigation correction system of claim 1 wherein said sensor detects movement of a steering wheel.

3. The navigation correction system of claim 2 wherein said sensor detects amount of movement of said steering wheel.

4. The navigation correction system of claim 1 wherein said sensor comprises a joystick.

5. The navigation correction system of claim 1 wherein said sensor detects direction of movement of a steering wheel and wherein said direction of movement of said steering wheel determines the direction in which said correction to said travel path is applied.

6. A method for correcting the travel path of a vehicle comprising:
   a) monitoring a sensor that detects operator input; and
   b) upon receiving operator input that indicates that a correction is to be made to a travel path of a vehicle, communicating with a guidance control system so as to correct said travel path of said vehicle without returning control of steering of said vehicle to an operator of said vehicle.

7. The method of claim 6 wherein said sensor detects movement of a steering wheel.

8. The method of claim 7 wherein said sensor detects amount of movement of said steering wheel.

9. The method of claim 8 wherein the amount of correction to said travel path of said vehicle is proportional to said amount of movement of said steering wheel.

10. The method of claim 8 wherein said correction to said travel path of said vehicle is made when said amount of movement of said steering wheel exceeds a predetermined threshold.

11. The method of claim 7 further comprising the step of:
    c) monitoring a button, said travel path of said vehicle corrected when said button is pressed and when said sensor detects said movement of said steering wheel.

12. The method of claim 6 wherein said sensor detects direction of movement of a steering wheel and wherein said direction of movement of said steering wheel determines the direction in which said correction to said travel path is applied.

13. The method of claim 6 wherein said sensor comprises a joystick.

14. In a computer system including a processor coupled to a bus, and a memory unit coupled to said bus for storing information, a computer-implemented method for correcting the travel path of a vehicle comprising the steps of:
    a) monitoring a sensor that detects operator input; and
    b) upon receiving operator input that indicates that a correction is to be made to a travel path of a vehicle, communicating with a guidance control system so as to correct said travel path of said vehicle without returning control of steering of said vehicle to an operator of said vehicle.

15. The computer-implemented method of claim 14 wherein said sensor detects movement of a steering wheel.

16. The computer-implemented method of claim 15 wherein said sensor detects amount of movement of said steering wheel.

17. The computer-implemented method of claim 16 wherein said correction to said travel path of said vehicle is made when said amount of movement of said steering wheel exceeds a predetermined threshold.

18. The computer-implemented method of claim 15 wherein said sensor detects direction of movement of said steering wheel and wherein said direction of movement of said steering wheel determines the direction in which said correction to said travel path is applied.

19. The computer-implemented method of claim 15 further comprising the step of:
    c) monitoring a button, said travel path of said vehicle corrected when said button is pressed and when said sensor detects said movement of said steering wheel.

20. The computer-implemented method of claim 14 wherein said sensor comprises a joystick.

* * * * *